E. H. COOPER.
BALL BEARING.
APPLICATION FILED OCT. 19, 1920.
1,374,988.
Patented Apr. 19, 1921.
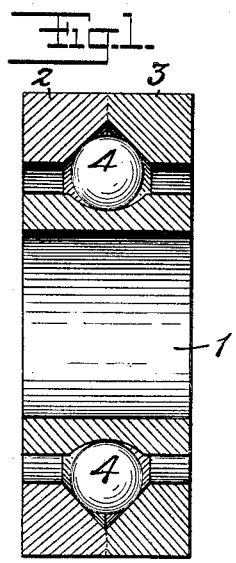
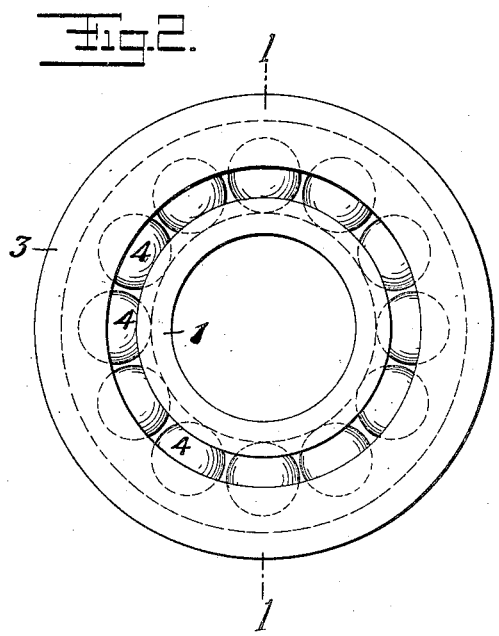
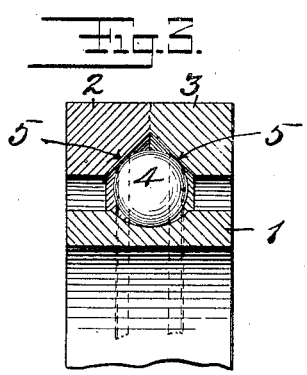
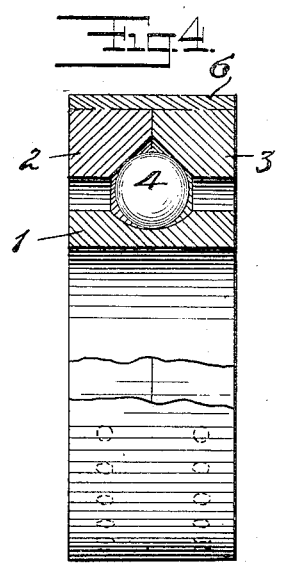
Inventor
E. H. Cooper
By his Attorneys

UNITED STATES PATENT OFFICE.

ELISHA H. COOPER, OF NEW BRITAIN, CONNECTICUT, ASSIGNOR TO THE FAFNIR BEARING COMPANY, OF NEW BRITAIN, CONNECTICUT, A CORPORATION OF CONNECTICUT.

BALL-BEARING.

1,374,988. Specification of Letters Patent. Patented Apr. 19, 1921.

Application filed October 19, 1920. Serial No. 417,981.

*To all whom it may concern:*

Be it known that I, ELISHA H. COOPER, a citizen of the United States of America, residing at New Britain, Hartford county, Connecticut, have invented a new and useful Ball-Bearing, of which the following is a specification.

My invention relates to ball bearings, and has particular reference to a so called "unitary" ball bearing of the single row type in which the bearing is so constructed as to effectively resist both radial and thrust loads.

In the accompanying drawing:

Figure 1 is a cross section of a bearing constructed to embody my invention, said section being taken on the plane of the line 1—1 of Fig. 2.

Fig. 2 is a side elevation of the complete bearing.

Fig. 3 is a sectional view illustrating a modification.

Fig. 4 is a similar view illustrating another modification.

1 represents the inner ring of a ball bearing. This ring has a circumferential ball race groove therein. The outer ring is made up of two ring-like pieces or sections 2—3 which are connected by welding. 4 are balls arranged in a single row or series. The two ring-sections 2—3 rest on opposite sides of the row of balls and bear angularly thereon. The ball contact surface of each section is suitably shaped and hardened to form a bearing track upon which the balls may run. The sections 2—3 are connected by welding in the same plane as the row of balls, but this part of the bearing ring does not contact with the balls since manifestly a proper bearing track or surface could not be formed by welding at the line of connection. The bearing thus constructed would be seen to furnish a three-point bearing on each ball. This furnishes a very powerful resistance to thrust loads.

The sections 2—3 of the outer bearing ring may be welded together in any desired manner, and the balls not only act as spacers during the welding operation, but when the welding is completed, they then operate to hold the bearing rings in the proper assembled and adjusted relation.

In Fig. 3, I have shown a slight modification in which I have provided destructive shims 5—5 between the balls and the adjacent ring sections 2—3. The presence of these shims prevents the two sections from being crowded too hard against the balls during the welding operation. These shims may be made of any suitable material such as paper, and this paper may be properly insulated so as to prevent current flow through the balls during the welding operation, in the event the electric welding process is employed.

In Fig. 4, I have shown the rings 2—3 as connected by welding, but in this event, instead of making a direct or homogeneous connection between the sections 2—3, I have provided a ring section 6 which overlies or bridges the ring sections 2—3, and which may be suitably welded to each of the same, for example, by the spot welding process, the spots being indicated in dotted lines. In this case, the outer sleeve 6 constitutes the outer surface of the outer bearing ring.

In the drawings, I have shown the outer bearing ring as the one being formed of two sections 2—3, but I do not wish to be limited thereto, since, it is perfectly obvious that either one of the bearing rings could be made in this way.

What I claim is:

1. In a single row three-point ball bearing of the unitary or assembled type, two bearing rings, one of said rings being formed of two ring-like sections connected by welding, a ball race way groove in one of the rings, two separately spaced ball tracks formed on the two sections of the other ring for engaging a row of balls on opposite sides, a single row of balls between said rings, that part of the two section bearing ring between said ball tracks being out of contact with said balls.

2. In a single row three-point ball bearing of a unitary type, two bearing rings, one being formed of two annular sections each having a ball track thereon arranged to engage a row of balls on opposite sides, and a sleeve fitted to said ring sections on the opposite side thereof from said ball tracks and secured thereto by welding to connect said ring sections, and a second bearing ring for supporting said row of balls on the opposite side from the first mentioned ring, said balls operating to hold both bearing rings in assembled and adjusted relation with respect to each other and with respect to said ball.

ELISHA H. COOPER.